(12) United States Patent
Hubbert et al.

(10) Patent No.: US 6,679,544 B1
(45) Date of Patent: Jan. 20, 2004

(54) MOLDED ENERGY ABSORBER

(75) Inventors: Timothy R. Hubbert, Novi, MI (US); Michael J. Hier, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/117,500

(22) Filed: Apr. 5, 2002

(51) Int. Cl.[7] .............................................. B60R 13/02
(52) U.S. Cl. .................... 296/187.05; 296/97.1
(58) Field of Search ........................ 296/189, 190.03, 296/191, 39.1, 97.1, 97.5, 187.05; 188/371, 376, 377; 280/751, 748

(56) References Cited

U.S. PATENT DOCUMENTS

| | | |
|---|---|---|
| 3,405,969 A | 10/1968 | Creel |
| 3,827,748 A | 8/1974 | Herr et al. |
| 5,308,137 A | 5/1994 | Viertel et al. |
| 5,556,154 A | 9/1996 | Vaxelaire |
| 5,577,796 A | 11/1996 | Clausen |
| 5,641,195 A | 6/1997 | Patel et al. |
| 5,741,045 A | 4/1998 | DeRees et al. |
| 6,068,320 A | 5/2000 | Miyano |
| 6,199,942 B1 | 3/2001 | Carroll, III et al. |
| 6,247,745 B1 * | 6/2001 | Carroll et al. .............. 296/189 |
| 6,554,333 B2 * | 4/2003 | Shimotsu et al. ........... 296/189 |

* cited by examiner

Primary Examiner—Joseph D. Pape
Assistant Examiner—Jason Morrow
(74) Attorney, Agent, or Firm—Bill C. Panagos

(57) ABSTRACT

A molded energy absorber includes two sections connected by a plurality of hinge elements. One section has a plurality of telescopically crushable tubular cylinders integrally molded thereon. The two sections are folded together and the energy absorber attaches to a structural vehicle pillar on the inside of the vehicle. Upon impact, the tubular cylinders are fractured and crush telescopically, thereby dissipating much of the impact energy.

24 Claims, 4 Drawing Sheets

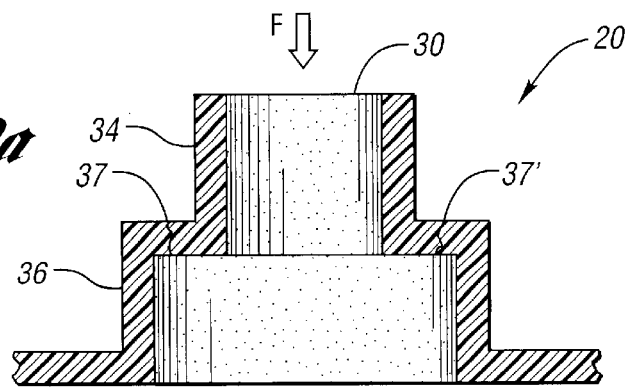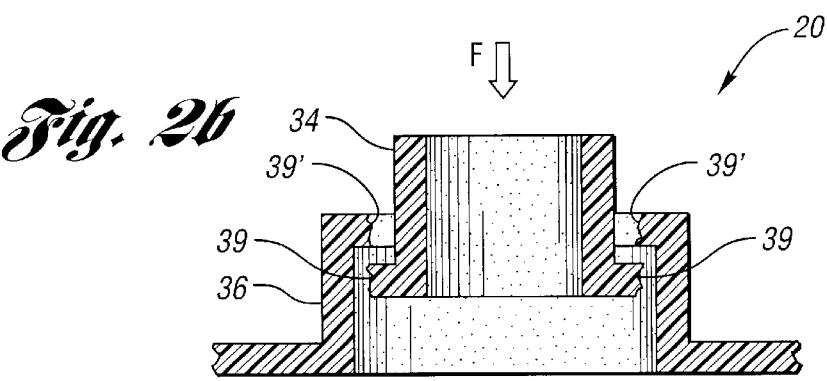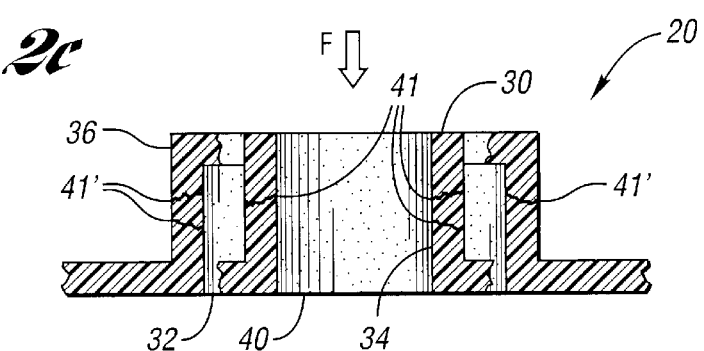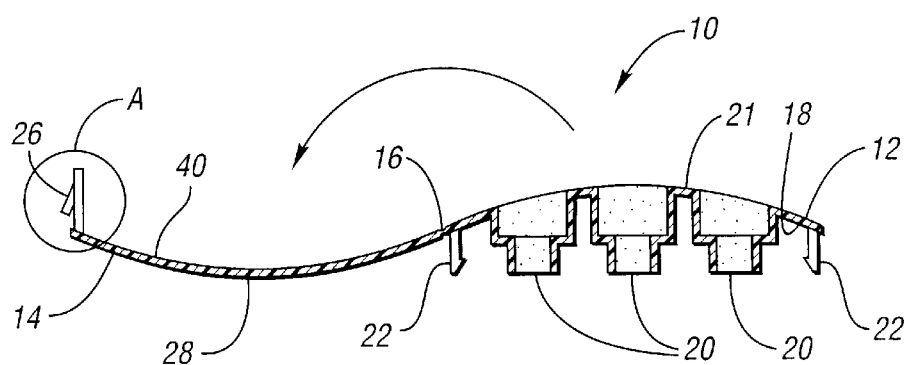

MOLDED ENERGY ABSORBER

BACKGROUND OF THE INVENTION

1. Field of the Invention

The present invention relates to a molded energy absorber.

2. Background Art

Use of vehicle pillars, and in particular those that absorb energy upon impact, is well known. Often the energy absorbing capability is found within an interior trim component which is attached to the structural pillar.

An example of this type of energy absorbing device is found in U.S. Pat. No. 5,641,195 issued to Patel et al. on Jun. 24, 1997. Patel discloses an interior trim component for a structural pillar that contains an elaborate network of energy absorbing elements. The trim component is a one-piece molded part that has energy absorbing elements integrally molded on the inside surfaces. These elements include a series of ribs and fingers that deflect on impact, thereby absorbing energy.

Another type of energy absorbing pillar cover is disclosed in U.S. Pat. No. 6,068,320 issued to Miyano on May 30, 2000. This device is also a one-piece molded plastic design, in which energy absorbing ribs are integrally molded on the inside of the pillar cover. When the pillar cover is impacted, it elastically deforms to allow the ribs to buckle.

The energy absorbing ribs of the type found in Patel and Miyano are relatively thin. This means they will deform upon impact to absorb some of the impact energy. However, it also means that if the ribs fracture, only small fracture surfaces are formed. Thus, much of the energy absorption capacity of these devices results from the elastic deformation of the ribs. In addition, the Patel and Miyano devices are specifically designed for use as trim components on structural members such as pillars. Although impact energy absorption at pillars is important, providing other interior components, such as sun visors, with energy absorbers, may increase passenger safety.

Accordingly, it is desirable to provide an improved molded energy absorber that is of relatively uncomplicated geometry, and therefore easy to manufacture, and which overcomes the shortcomings of prior art energy absorbers by utilizing energy absorbing structures specifically designed to fracture upon impact to increase the amount of energy absorbed, and which is applicable to various vehicle interior components.

SUMMARY OF THE INVENTION

Therefore, one aspect of the present invention provides an improved molded energy absorber for use in the interior of a vehicle that is easily manufactured, has relatively uncomplicated geometry, and relies on the formation of fracture surfaces to absorb impact energy.

Another aspect of the invention provides an improved molded energy absorber that can be used on various vehicle interior components.

Still another aspect of the present invention provides a molded energy absorber for use in the interior of a vehicle that comprises a first section having an inner surface and an outer surface, and at least one longitudinal edge. Integrally molded onto a surface of the first section is a plurality of telescopically crushable tubular elements that are sufficiently telescopically crushable to absorb impact energy. The energy absorber also includes a second section having an inner surface and an outer surface and at least one longitudinal edge. Disposed along a longitudinal edge of the two sections is a hinge element that forms an axis of rotation for folding the two sections together.

Yet another aspect of the invention provides a molded energy absorber for use in the interior of a vehicle that comprises a first section having an inner surface and an outer surface, and at least one longitudinal edge. A plurality of telescopically crushable, generally cylindrical elements is integrally molded onto a surface of the first section. The generally cylindrical elements include a tubular lower portion and a solid upper portion, characterized by a difference in diameter. The difference in diameter between the upper and lower portions creates a shear line along which a fracture surface forms to absorb impact energy when one of the generally cylindrical elements is crushed. The energy absorber also includes a second section having an inner and an outer surface, and at least one longitudinal edge. A hinge element is disposed along a longitudinal edge of the first and second sections, forming an axis of rotation for folding the first section onto the second section.

A further aspect of the invention provides a vehicle structural pillar having an interior side and an exterior side, wherein the interior side is covered with a molded energy absorber that comprises a first section having an inner surface and an outer surface, and at least one longitudinal edge. A plurality of telescopically crushable tubular elements sufficiently telescopically crushable to absorb impact energy is integrally molded onto a surface of the first section. There is a second section which also has an inner surface, an outer surface, and at least one longitudinal edge. Disposed along a longitudinal edge of the two sections is a hinge element that forms an axis of rotation for folding the two sections together. The energy absorber also includes a retaining device attached to a surface of one of the sections configured to attach the molded energy absorber to the pillar.

Another aspect of the invention provides a vehicle sun visor that comprises a first section having an inner surface and an outer surface, and at least one longitudinal edge. Integrally molded onto a surface of the first section is a plurality of telescopically crushable tubular elements that are sufficiently telescopically crushable to absorb impact energy. The sun visor also includes a second section having an inner surface and an outer surface and at least one longitudinal edge. Disposed along a longitudinal edge of the two sections is a hinge element that forms an axis of rotation for folding the two sections together.

The above object and other objects, features, and advantages of the present invention are readily apparent from the following detailed description of the best modes for caring out the invention when taken in connection with the accompanying drawings.

BRIEF DESCRIPTION OF THE DRAWINGS

FIGS. 2a–2c are fragmentary sectional views of the cylinder shown in FIG. 2, illustrating the stages of energy absorption during impact;

FIG. 3 is an end-view of the energy absorber shown in FIG. 1, illustrating how the two sections fold together;

DETAILED DESCRIPTION OF THE PREFERRED EMBODIMENT(S)

Figure 1:
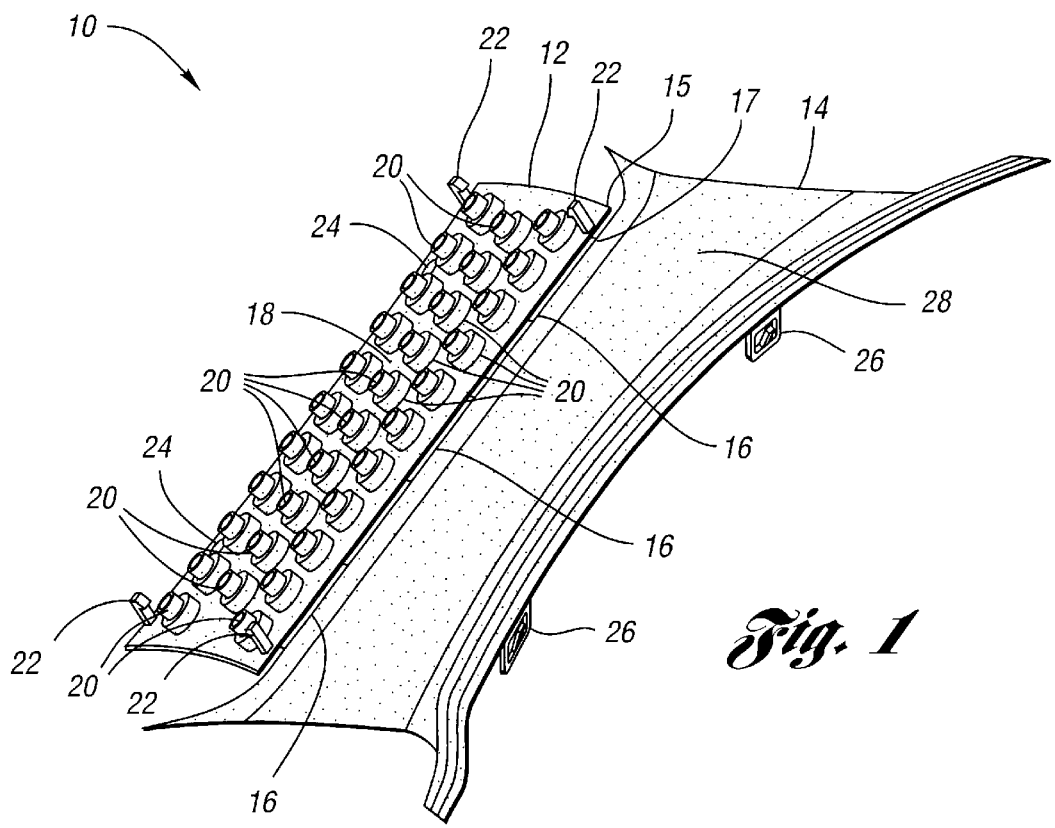
FIG. 1 is a perspective view of the present invention configured for use on the structural pillar of a vehicle, showing the crushable hollow cylinders and attachment devices used to secure the energy absorber to the pillar.

FIG. 1 shows a molded energy absorber 10 configured for use on the structural pillar of a vehicle. The energy absorber 10 includes a first section 12 and a second section 14 that are connected together by a living hinge or a plurality of such hinges 16. The hinges 16 are located along a longitudinal edge 15 of the first section 12, and a longitudinal edge 17 of the second section 14. In a preferred embodiment, the two sections and the hinges comprise a one-piece structure molded from a polymeric material. The first section 12 has an outer surface 18 on which a plurality of telescopically crushable tubular elements 20 are molded. In this embodiment, the tubular elements 20 are telescoping cylinders having circular cross-sections, though use of tubular elements with non-circular cross-sections is contemplated. The telescoping cylinders 20 can also be molded on an inner surface 21, shown in FIG. 3, but manufacturing considerations will usually dictate that the cylinders be molded on the outer surface 18.

The first section 12 also contains a retaining device which in this embodiment comprises retaining clips 22 for attaching the energy absorber 10 to a structural pillar of a vehicle. The retaining clips 22 are convenient because they are uncomplicated and easy to manufacture. In this embodiment, the retaining clips 22 are molded directly onto the outer surface 18 of the first section 12. Of course other retaining devices can be used, including those that are not integrally molded onto the surface of one of the sections 12, 14. Thus, structural pillars requiring different attachment mechanisms are easily accommodated. As seen in FIG. 1, apertures 24 in the first section 12 are designed to receive clips 26 from the second section 14. When the two sections 12, 14 are folded together, see FIGS. 3 and 4, the clips 26 and apertures 24 form a closure mechanism that keeps the two sections 12, 14 together.

The second section 14 has an outer surface 28 that is a show surface having an appearance finish designed to match the interior of the vehicle into which it is placed. The show surface 28 is molded in finished form—i.e., molded with colors and a texture to match the vehicle's interior. This eliminates additional steps and results in an overall cost savings. The energy absorbing capacity of the energy absorber 10 is in part dependent on the telescoping cylinders 20 which are designed to fracture upon impact, thereby absorbing energy as fracture surfaces are created.

Figure 2:
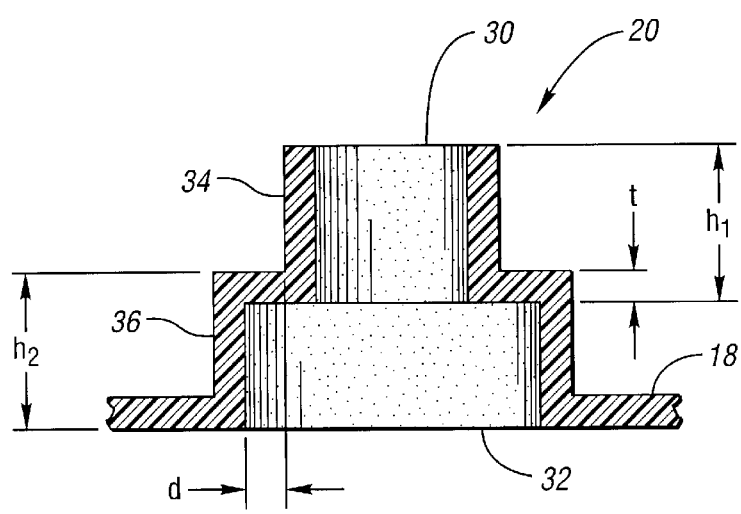
FIG. 2 is a fragmentary sectional view of a typical crushable hollow cylinder, showing some relevant parameters.

FIG. 2 shows a cross-section of a typical telescoping cylinder 20 with some of the design parameters illustrated. The telescoping cylinder 20 has top and bottom surfaces 30, 32, and upper and lower portions 34, 36. The upper portion 34 has a smaller diameter than the lower portion 36, which facilitates molding of the energy absorber 10. However, if the upper portion 34 has a larger diameter than the lower portion 36, the telescoping cylinder 20 will still function as an energy absorber. Parameters (t), (d), ($h_1$), and ($h_2$) can be varied to provide a telescoping cylinder having greater or lesser energy absorbing capacity. For example, as dimension (t) increases, so too does the energy absorbing capacity of the telescoping cylinder 20. In part, this is due to the fracture mechanisms that occur during impact. When an impact occurs, a force (F) is imparted to the top surface 30 of the telescoping cylinder 20, see FIG. 2a. It is readily understood that (F) is used to represent what may be a variety of forces having different magnitudes and different orientations. As the telescoping cylinder 20 starts to absorb energy, cracks 37, 37' begin to form around its circumference. The cracks 37, 37' form at theoretical shear lines that indicate where fracture will occur. As is readily understood by those familiar with fracture mechanics, the exact location and orientation of the cracks 37, 37' may differ depending on where the cross-section of the telescoping cylinder 20 is taken.

If the magnitude of the force (F) is great enough, the telescoping cylinder 20 will shear, and the upper portion 34 will release from the lower portion 36, see FIG. 2b. When fracture occurs, a fracture surface 39 forms circumferentially around the upper portion 34, and a complimentary fracture surface 39' forms circumferentially around the lower portion 36. The fracture surfaces 39, 39' have a width approximately equal to (t); therefore, increasing (t) increases the fracture surface area and the energy absorbing capacity of the telescoping cylinder 20.

Another important parameter of the telescoping cylinder 20 is the distance (d) that the upper portion 34 extends inward from the lower portion 36. As (d) increases, so too does the moment arm employed by the force (F). As the moment arm increases, the stress felt by the telescoping cylinder 20 also increases. Increasing (d) makes the telescoping cylinder 20 prone to fracture at lower compressive forces and therefore reduces the energy absorbing capacity of the telescoping cylinder 20. The heights ($h_1$), ($h_2$) of the upper and lower portions 34, 36 can also be varied to meet the needs of a particular application. For example, ($h_1$) and/or ($h_2$) can be reduced to provide an energy absorber having a slim profile. In addition, the ultimate resistance of the telescoping cylinders 20 may be increased by making ($h_1$) approximately equal to ($h_2$), as explained below.

Figure 10:
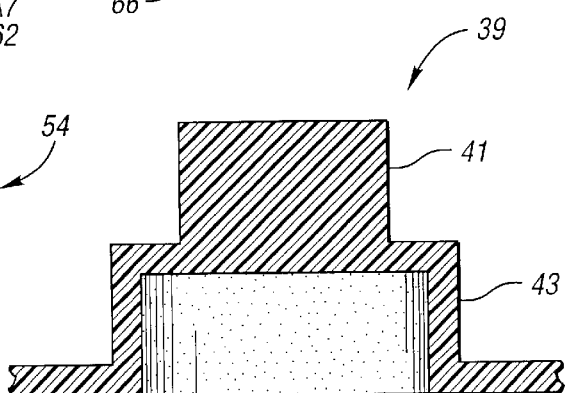
FIG. 10 is a fragmentary sectional view of a crushable cylinder having a solid upper portion.

FIG. 2c illustrates the final stages of energy absorption by the telescoping cylinder 20. As the upper portion 34 moves in the direction of the force (F), it is stopped by an inner surface 40 of the second section 14 (see also FIG. 3). At this stage, ultimate resistance occurs as the force (F) works to buckle the upper and lower portions 34, 36, causing cracks 40, 40' to form in the upper and lower portions 34, 36. This is why making ($h_1$) approximately equal to ($h_2$) increases the ultimate resistance of the telescoping cylinder 20: the force (F) must work to buckle the upper and lower portions 34, 36 virtually simultaneously. Although the upper portion 34 is depicted as a hollow cylinder, it can also be made with a solid cross-section, thereby further increasing the ultimate resistance of the telescoping cylinder 20. An example of a telescoping cylinder 39, having a solid upper portion 41 and a hollow lower portion 43 is shown in FIG. 10. Manipulation of the aforementioned parameters is one way to adjust the energy absorbing capacity of the telescoping cylinders 20 and therefore the energy absorber 10. As described below, another way is to change the material from which the energy absorber 10, and in particular the telescoping cylinders 20, is manufactured.

Although a preferred embodiment of the energy absorber 10 is made from a molded one-piece polymer such as a polycarbonate acrylonitrile butadiene styrene (PC-ABS), any number of other polymeric materials may be used, depending on the needs of a particular application. Where greater energy absorbing capacity is desired, a mild steel such as a 1008 or 1010 carbon steel can be used in place of a polymer. For instance, a B-pillar which requires more rigidity than an A-pillar, can be fitted with an energy absorber 10 made from mild steel to increase the energy absorbing capacity at the B-pillar. Another way to adjust the energy absorbing capacity of the energy absorber is to change the distribution density of the telescoping cylinders 20. Increasing the number of telescoping cylinders 20 in a given area, increases the energy absorbing capacity in that area. Thus, a designer can fine tune the energy absorber 10 to meet very specific needs. The dimensions, the distribution density, and the materials used to make the telescoping cylinders 20 can all be varied, thereby allowing various energy absorbers to be tailored to different impact zones within the vehicle interior.

It is worth noting that the energy absorber 10 need not be of unitary construction, but rather may be a hybrid. That is, the first section 12 including the telescoping cylinders 20 can be made from a mild steel to increase energy absorbing capacity, while the second section 14 and the hinges 16 can be made from a lightweight, inexpensive polymer. Although somewhat more complicated to manufacture, a hybrid energy absorber has a high energy absorbing capacity, yet weighs less than an all metal construction. In addition, having the second section 14 constructed of a polymeric material helps to ensure that there will not be problems with buzz, squeak, and rattle (BSR) noises that could occur with an all metal energy absorber.

Figure 4:
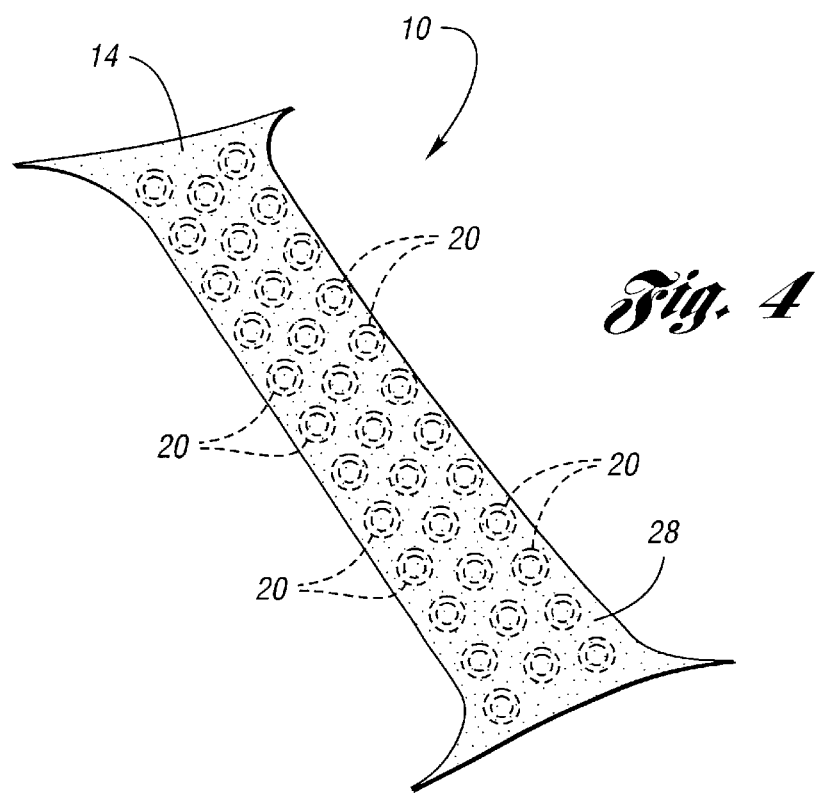
FIG. 4 is a front view of the energy absorber ready for installation onto the structural pillar of a vehicle after the two sections have been folded together.
Figure 5:
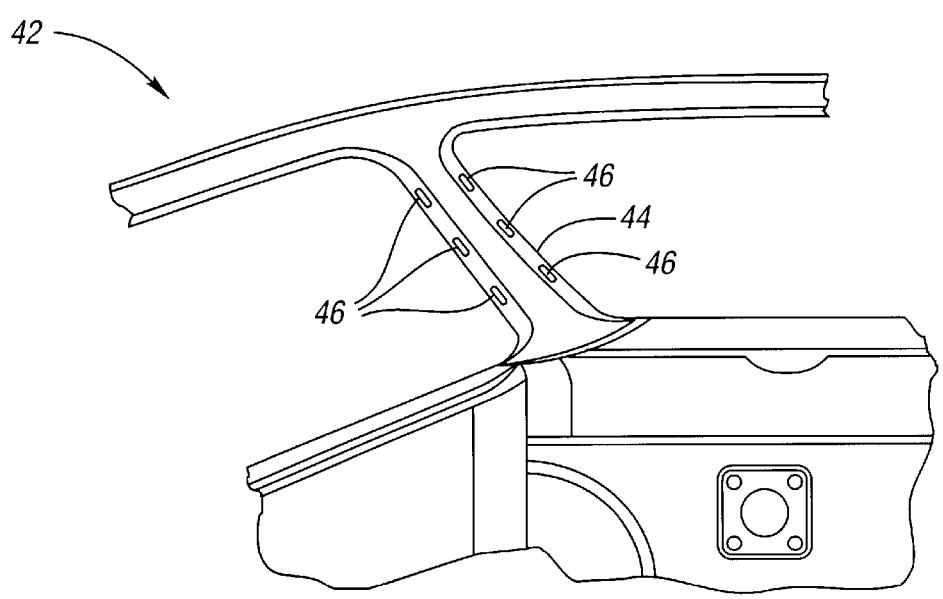
FIG. 5 is a fragmentary illustrative view of a portion of the interior of a vehicle showing an A-pillar with a plurality of apertures for receiving the retaining clips of the energy absorber.

FIG. 3 shows an end-view of the energy absorber 10 that illustrates how the two sections 12 and 14 are fitted together. The two sections 12, 14 rotate about the hinges 16 so that the inner surface 21 of the first section 12 approaches inner surface 40 of the second section 14. The clips 26 fit into the apertures 24, shown in FIG. 1, so that the two sections 12, 14 are secured together and ready for installation as shown in FIG. 4. FIG. 5 shows a portion of a vehicle interior 42 that includes an A-pillar 44 ready to receive the energy absorber 10. Apertures 46 in the A-pillar 44 are designed to receive the retaining clips 22 from the energy absorber 10. After the energy absorber 10 is installed onto the A-pillar 44, only the show surface 28 is seen by the passenger. Thus, the energy absorber 10 is easy to manufacture and install. After removal from the mold, the two sections 12, 14 of the single-piece energy absorber 10 are folded together until the clips 26 engage the apertures 24. Because the outer surface 28 of the second section 14 has a show surface with an appearance finish, the energy absorber 10 is ready for installation on the structural pillar 44. An operator merely snaps the retaining clips 22 into the apertures 46 to complete the installation.

Figure 6:
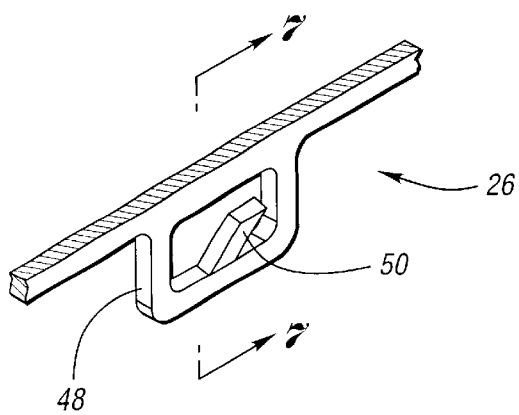
FIG. 6 is a fragmentary perspective view of one of the retaining clips called out in circle A in FIG. 3.
Figure 7:
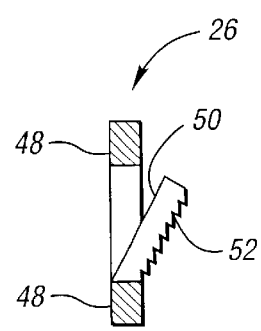
FIG. 7 is a fragmentary sectional view taken through line 7—7 in FIG. 6.

The clip 26 shown in circle A in FIG. 3 is detailed in FIG. 6. The clip 26 is easy to manufacture, yet capable of securely fastening the two sections 12, 14 together. A frame 48 holds a retainer 50 designed to be flexible as it enters the aperture 24. As seen in FIG. 7, the flexible retainer 50 has a barbed edge 52 which helps keep the clip 26 secured inside the aperture 24. It is contemplated that a clip design of this type will work equally as well for the retaining clips 22 which hold the energy absorber 10 to a vehicle pillar such as 44 shown in FIG. 5.

Figure 8:
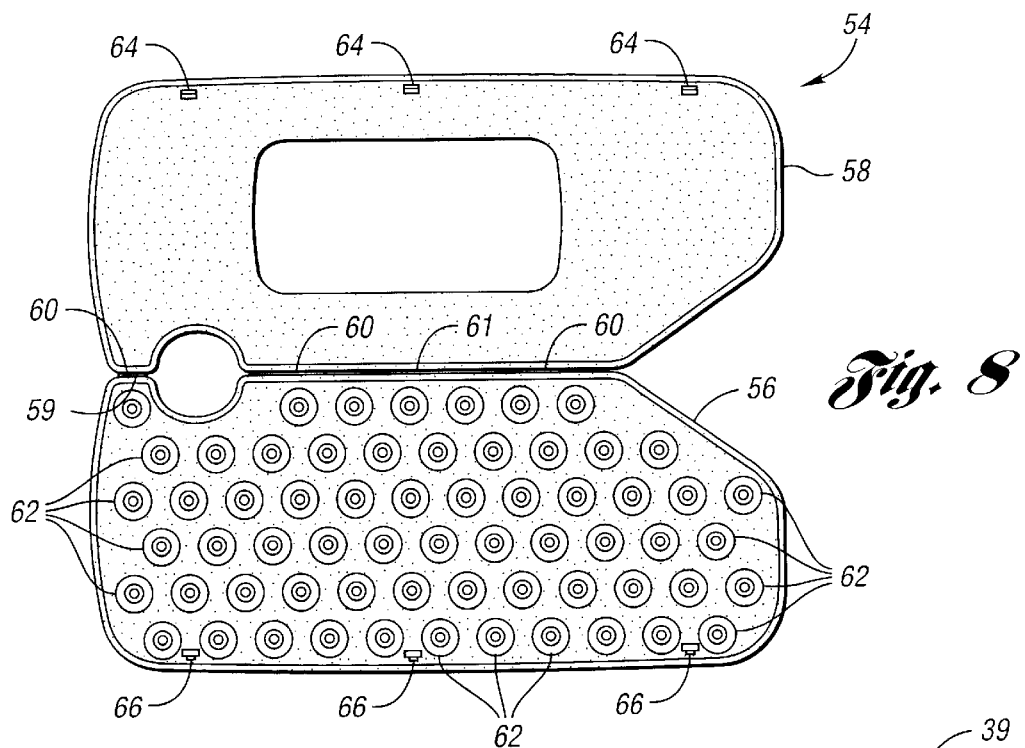
FIG. 8 shows the energy absorber configured for use as a sun visor in a vehicle.
Figure 9:
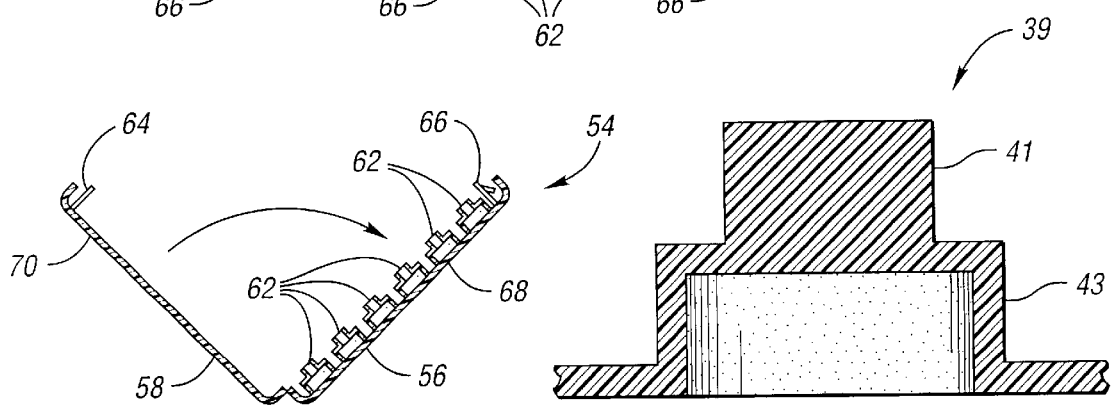
FIG. 9 illustrates how the two sections of the energy absorber shown in FIG. 8 snap together.

The energy absorber of the present invention can also be configured for applications other than covering a structural pillar. For instance, an energy absorbing sun visor 54 shown in FIG. 8 is an alternative embodiment of the energy absorber of the present invention. Similar to the energy absorber 10 used on a structural pillar, the sun visor 54 has a first section 56 connected to a second section 58 by a living hinge or a plurality of such hinges 60. The hinges 60 are located along a longitudinal edge 59 of the first section 56 and a longitudinal edge 61 of the second section 58. Telescopically crushable tubular elements 62 are designed similar to the telescoping cylinders 20 used in the energy absorber 10. As with the energy absorber 10, the first and second sections 56, 58 of the sun visor 54 can be folded together as shown in FIG. 9. To keep the two sections 56, 58 secured together, a series of clips 64, 66 is used. The clips 66 resemble the clips 26 used in the energy absorber 10. The clips 64 do not have a retainer such as 50 shown in FIG. 6, but rather only a frame such as 48. This eliminates the need to have apertures in the second section 58 of the sun visor 54. The sun visor 54 can be manufactured with one or both surfaces 68, 70 being show surfaces having an appearance finish. In the alternative, the sun visor 54 can be manufactured with unfinished outer surfaces 68, 70, such that it is necessary to cover these surfaces prior to installing the sun visor 54 into the vehicle. Thus, the energy absorber of the present invention has uses in a variety of applications, pillar covers and sun visors merely representing two of these.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A molded energy absorber for use in the interior of a vehicle, comprising:

a first section having an inner surface and an outer surface, and at least one longitudinal edge;

a plurality of telescopically crushable tubular elements, integrally molded onto a surface of the first section;

a second section having an inner surface and an outer surface, and at least one longitudinal edge; and a hinge element disposed along a longitudinal edge of the first section and a longitudinal edge of the second section, forming an axis of rotation for folding the first section onto the second section.

2. The molded energy absorber of claim 1, wherein the telescopically crushable tubular elements comprise telescoping cylinders having an upper portion and a lower portion, characterized by a difference in diameter that creates a shear line along which a fracture surface forms to absorb impact energy when a tubular element is telescopically crushed.

3. The molded energy absorber of claim 1, further comprising a clip integrally molded onto the inner surface of one of the sections, and an aperture in the other section for receiving the clip when the two sections are folded together.

4. The molded energy absorber of claim 1, wherein the energy absorber is configured as a cover for a structural pillar of a vehicle.

5. The molded energy absorber of claim 4, further comprising a retaining device attached to a surface of one of the sections, configured to attach the molded energy absorber to a structural pillar of a vehicle.

6. The molded energy absorber of claim 5, wherein the retaining device comprises a clip configured for retention by an aperture in a structural pillar of a vehicle.

7. The molded energy absorber of claim 1, wherein the energy absorber is molded of a single polymeric material.

8. The molded energy absorber of claim 1, wherein the first section is molded of one material and the second section is molded of another material.

9. The molded energy absorber of claim 1, wherein the first section is molded of a metallic material.

10. The molded energy absorber of claim 1, wherein the outer surface of at least one of the sections is a show surface.

11. The molded energy absorber of claim 1, wherein the energy absorber is configured as a sun visor.

12. A molded energy absorber for use in the interior of a vehicle, comprising:
- a first section having an inner surface and an outer surface, and at least one longitudinal edge;
- a plurality of telescopically crushable generally cylindrical elements, integrally molded onto a surface of the first section;
- a second section having an inner surface and an outer surface, and at least one longitudinal edge; and
- a hinge element disposed along a longitudinal edge of the first section and a longitudinal edge of the second section, forming an axis of rotation for folding the first section onto the second section.

13. The molded energy absorber of claim 12, wherein the telescopically crushable generally cylindrical elements comprise a tubular lower portion and a solid upper portion, characterized by a difference in diameter that creates a shear line along which a fracture surface forms to absorb impact energy when a tubular element is telescopically crushed.

14. The molded energy absorber of claim 13, further comprising a clip integrally molded onto the inner surface of the one section, and an aperture in the other section for receiving the clip when the two sections are folded together.

15. The molded energy absorber of claim 13, wherein the energy absorber is configured as a cover for a structural pillar of a vehicle.

16. A vehicle structural pillar having an interior side and an exterior side, wherein the interior side is covered with a molded energy absorber, the energy absorber comprising:
- a first section having an inner surface and an outer surface, and at least one longitudinal edge;
- a plurality of telescopically crushable tubular elements, integrally molded onto a surface of the first section;
- a second section having an inner surface and an outer surface, and at least one longitudinal edge;
- a hinge element disposed along a longitudinal edge of the first section and a longitudinal edge of the second section, forming an axis of rotation for folding the first section onto the second section; and
- a retaining device attached to a surface of one of the sections, configured to attach the molded energy absorber to the structural pillar.

17. The molded energy absorber of claim 16, wherein the telescopically crushable tubular elements comprise telescoping cylinders having an upper portion and a lower portion, characterized by a difference in diameter that creates a shear line along which a fracture surface forms to absorb impact energy when a tubular element is telescopically crushed.

18. The molded energy absorber of claim 17, wherein the retaining device comprises a clip configured for retention by an aperture in the structural pillar.

19. The molded energy absorber of claim 16, further comprising a clip integrally molded onto the inner surface of one section, and an aperture in the other section for receiving the clip when the two sections are folded together.

20. A vehicle sun visor, comprising:
- a first section having an inner surface and an outer surface, and at least one longitudinal edge;
- a plurality of telescopically crushable tubular elements, integrally molded onto a surface of the first section;
- a second section having an inner surface and an outer surface, and at least one longitudinal edge; and
- a hinge element disposed along a longitudinal edge of the first section and a longitudinal edge of the second section, forming an axis of rotation for folding the first section onto the second section.

21. The molded energy absorber of claim 20, wherein the telescopically crushable tubular elements comprise telescoping cylinders having an upper portion and a lower portion, characterized by a difference in diameter that creates a shear line along which a fracture surface forms to absorb impact energy when a tubular element is telescopically crushed.

22. The molded energy absorber of claim 20, further comprising a clip integrally molded onto the inner surface of one section, and an aperture in the other section designed to receive the clip when the two sections are folded together.

23. The molded energy absorber of claim 20, wherein the outer surface of at least one of the sections is a show surface.

24. The molded energy absorber of claim 20, further comprising a cover for covering the outer surface of at least one of the sections.

* * * * *